H. L. BROCK
L. G. SMITH
INVENTOR.

Oct. 7, 1952  H. L. BROCK ET AL  2,612,783
TRACTOR SPEED TRANSMISSION
Filed Feb. 18, 1950  2 SHEETS—SHEET 2

H. L. BROCK
L. G. SMITH
INVENTOR.

BY *E. C. McRae*
*E. R. Faulkner*
*D. H. Oster*
ATTORNEYS

Patented Oct. 7, 1952

2,612,783

UNITED STATES PATENT OFFICE 2,612,783

TRACTOR SPEED TRANSMISSION

Harold L. Brock, Detroit, and Leon G. Smith, Royal Oak, Mich., assignors to Ford Motor Company, Dearborn, Mich., a corporation of Delaware Application February 18, 1950, Serial No. 145,028

6 Claims. (Cl. 74—15.86)

This invention relates generally to tractors and more particularly to tractor clutch mechanisms.

An object of the present invention is to provide a tractor having an auxiliary clutch arranged so that the tractor may be stopped without interrupting the continuous operation of the power take off shaft and the hydraulic pump. In tractors in which the power take off shaft and the hydraulic pump are driven by the transmission countershaft these units can be operated only when the tractor is stopped by shifting the transmission into neutral and this, of course, results in a momentary interruption in their operation since the main tractor clutch must be disengaged to permit the transmission to be shifted. The proposed construction provides an auxiliary or traction clutch between the transmission main shaft and the rear axle to permit the power flow to the rear drive wheels to be broken without interfering with the continuous operation of the hydraulic pump and power take off shaft.

A further object of the invention is to provide interlock mechanism between the auxiliary clutch and the tractor main clutch. After the auxiliary clutch has been disengaged the interlock mechanism of the present invention is effective to prevent the auxiliary clutch from being re-engaged directly. To again apply power to the rear drive wheels of the tractor after the auxiliary clutch has been disengaged, it is necessary to depress the regular clutch pedal to momentarily disengage the main clutch and to then release the clutch pedal to re-engage the main clutch. In the time interval in which the main clutch is disengaged the interlock mechanism is effective to release the auxiliary clutch throwout lever and to automatically re-engage the auxiliary clutch so that when the main clutch is again re-engaged, the power path from the engine to the rear drive wheels is complete. With this arrangement the auxiliary clutch need not be constructed to take the entire starting load of the tractor and implement and does not need to have the slipping and wear characteristics which would otherwise be necessary.

Another object of the invention is to provide an auxiliary clutch between the engine and drive wheels of a tractor which is compact in size, economical to manufacture and install, positive in operation and simple to operate.

The foregoing and other advantages of the present invention will be made more apparent as this description proceeds, particularly when considered in connection with the accompanying drawings, wherein:

Figure 5 is a plan view, partly in section, of a portion of the tractor illustrating the traction clutch throwout mechanism.

Figure 1:
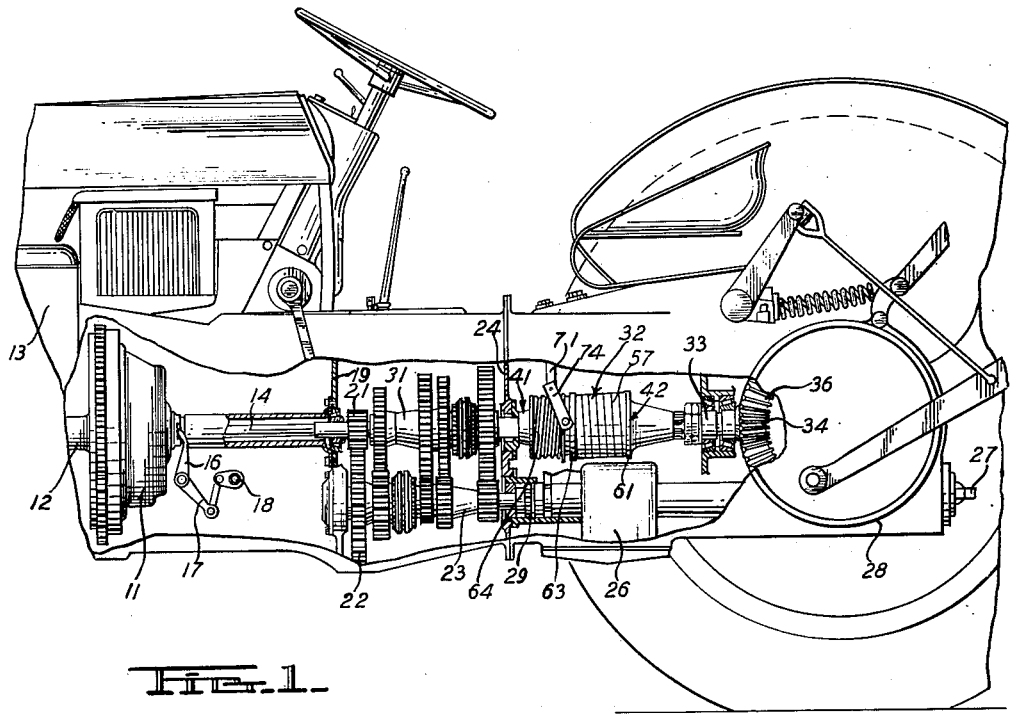
Figure 1 is a fragmentary side elevational view of a tractor, partly broken away and in section, and embodying the construction of the present invention.

Referring now more particularly to the drawings, and particularly to Figure 1, it will be seen that a conventional friction disc clutch assembly 11 is interposed between the rearward end of the crankshaft 12 of the engine 13 and the driveshaft 14. The clutch 11 is conventional in construction and is controlled by a clutch throwout lever 16 interconnected by suitable linkage 17 to a clutch shaft 18. The rearward end of the driveshaft 14 is journaled in a wall 19 of the tractor housing and has a drive pinion 21 at its rearward end. The drive pinion 21 is in constant mesh with a driven gear 22 mounted upon the transmission countershaft 23. The transmission countershaft 23 extends through a second wall 24 in the tractor housing and drives a conventional hydraulic pump 26 and the power take-off shaft 27. The rearward end of the power takeoff shaft 27 extends through the rearward end of the rear axle housing 28 and is available for driving implements or other accessories. A clutch 29 is interposed in the power train to the hydraulic pump and power takeoff shaft so that the pump and shaft may be manually disconnected from the power drive if desired.

The forward end of the main shaft 31 of the transmission is journaled in the pinion 21 and the rearward end of the shaft extends through the housing 24 and is adapted to be selectively connected by means of an auxiliary or traction clutch 32 to a pinion shaft 33 which carries at its rearward end a rear axle drive pinion 34 meshing with the ring gear 36 of a conventional rear axle construction.

The auxiliary clutch 32, best shown in Figure 3, will now be described. The traction clutch includes a pair of axially aligned clutch drums 41 and 42. The front clutch drum 41 has a hub 43 splined to the rearward end of the transmission main shaft 31 and an annular rearwardly extending extension 44 the outer and inner surfaces of which form friction clutch surfaces. The rear clutch drum 42 has a hub 46 splined to the forward end of the pinion shaft 33 and a forwardly extending annular extension 47, the outer and inner surfaces of which form friction clutch surfaces and are in alignment with the corresponding outer and inner surfaces of the extension 44 of the front clutch drum. The two clutch drums are held in axial alignment by means of a stub shaft 48 having its forward end pressed into the hub 43 of the front clutch drum and a sleeve 49 having its rearward end pressed into the hub 46 of the rear clutch drum 42. A pair of anti-friction bushings 51 are located between the shaft 48 and sleeve 49. The rearward end of the shaft 48 is provided with a threaded extension 52 extending through a collar 53 pressed into the hub 46 of the rear clutch drum. A lock nut 56 and washer 54 on the shaft extension 52 retains the collar 53 against the end of the shaft 48 to locate the two clutch drums and hold them in properly spaced relationship. The collar 53 has a running fit with the end of the shaft 48 to permit relative rotation therebetween when the traction clutch is disengaged.

The exterior cylindrical frictional surfaces of the annular extensions 44 and 47 of the front and rear clutch drums 41 and 42 respectively are encircled by a forward drive helical spring 57 of the type commonly used in overrunning clutches and other clutch mechanisms. The rearward convolution of the spring 57 has a tab 58 bent rearwardly therefrom and seated within a hole 59 formed in the flange 61 of the rear clutch drum. The convolutions of the forward drive spring 57 are positioned closely adjacent each other, and the spring in its free position is spaced a short distance radially outwardly from the outer frictional surfaces of the two clutch drums.

A throwout collar 63 is splined on the outer surface of the front clutch drum 41 and is normally urged rearwardly against the forward drive spring 57 by means of a coil spring 64. The spring 64 normally urges the throwout collar into engagement with the forward end of the friction spring 57. The tapered inner surface of the clutch throwout collar is wedged against the correspondingly tapered outer surface of the forward end of the spring 57 and forces the first convolutions of the spring into frictional engagement with the outer cylindrical surface of the front clutch drum 41. Inasmuch as the spring 57 is wound in the same direction as the direction of rotation of the transmission shaft 31 in forward drive the self-energization of the spring quickly wraps it into full frictional engagement with the outer cylindrical surfaces of the extensions 44 and 47 of the front and rear clutch drums so that the two are effectively locked together and the power is transmitted from the transmission main shaft 31 to the axle pinion shaft 33 to drive the rear wheels of the tractor. As will be described more in detail hereinafter, suitable mechanism is provided for disengaging the clutch throwout collar 63 to disengage the forward drive spring 57 of the traction clutch.

A reverse drive spring 66 of the same general type as the forward drive spring 57 is seated upon the outer surface of the sleeve 49 in its free position. The rearward end of the spring is provided with a tab 67 seated in a hole 68 formed in the hub 46 of the rear clutch drum to form an anchor for the spring. The outer frictional surface of the convolutions of the reverse drive spring 66 are normally spaced radially inwardly from the inner frictional surfaces of the extensions 44 and 47 of the front and rear clutch drums. The spring 66 may be expanded into engagement with these frictional surfaces, however, by means of an energizing spring 69, similar in construction to the spring 66 but considerably smaller in cross sectional dimension. The rearward convolution of the energizing spring 69 is connected to the forward convolution of the reverse drive spring 66, and the energizing spring 69 in its normal position is in light frictional engagement with the inner frictional surface of the extension 44 of the front clutch drum 41. Inasmuch as the energizing spring 69 is wound in the opposite direction to the direction of rotation of the main transmission shaft 31 in forward speed, the energizing spring will not be wound into tight frictional engagement with the clutch drum during forward rotation. When the transmission main shaft 31 is rotating in reverse direction, however, the energizing spring 69 will quickly wind into tight frictional engagement with the inner frictional surface of the front clutch drum and will energize the reverse drive spring 66 so that the latter is likewise expanded into tight frictional engagement with the inner frictional surfaces of the extensions 44 and 47 of the front and rear clutch drums. When this happens the two clutch drums are locked together and power is transmitted through the traction clutch to the rear drive wheels in reverse direction. It will thus be seen that the reverse drive spring is automatically actuated during reverse operation and no separate actuating mechanism is required.

Figure 3:
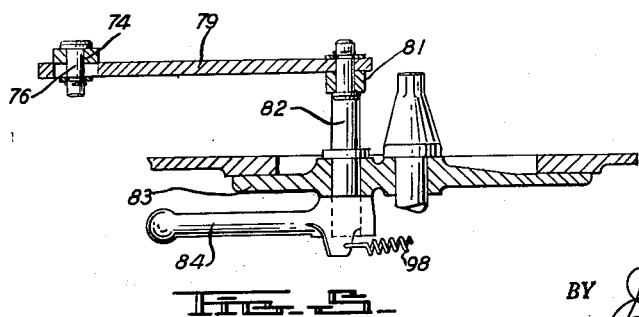
Figure 3 is an enlarged longitudinal cross sectional view of a portion of the tractor illustrating the traction clutch.
Figure 3:
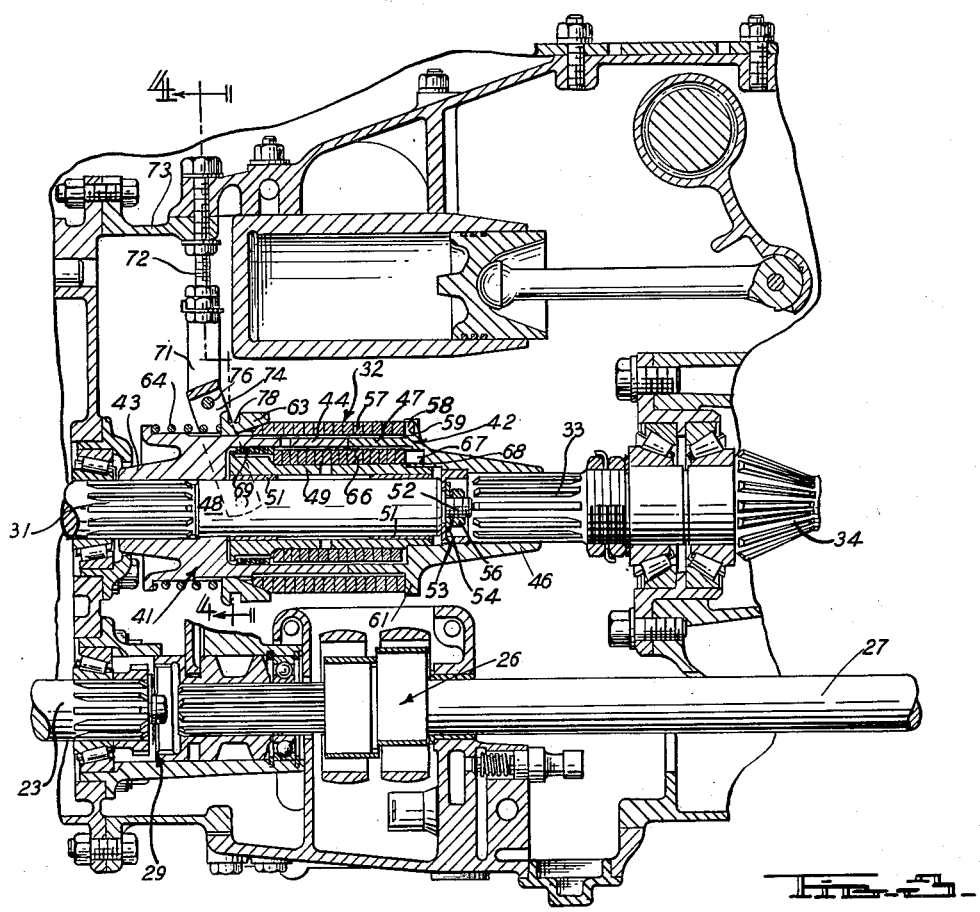
Figure 4:
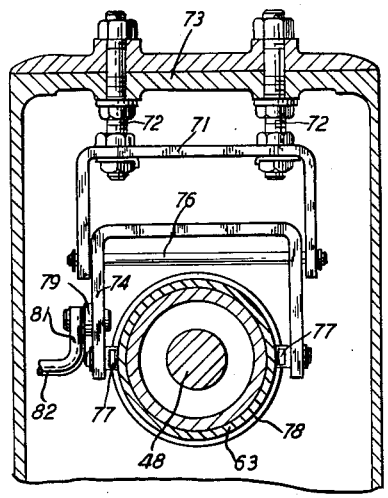
Figure 4 is a transverse cross sectional view taken on the line 4—4 of Figure 3.

The actuating mechanism for the auxiliary clutch is best seen in Figures 3 and 4. A downwardly opening U-shaped bracket 71 is adjustably mounted by means of bolts 72 to the top wall 73 of the tractor housing. A yoke 74, also U-shaped, is mounted for pivotal movement upon the bracket 71 by means of a shaft 76. The downwardly depending arms of the yoke 74 carry lugs 77 which are seated within the groove 78 formed in the traction clutch throwout collar 63.

It will be seen that rotation of the yoke 74 in the clockwise direction as seen in Figure 3 shifts the collar 63 to the left and results in disengaging the forward drive spring 57 of the traction clutch, thereby disconnecting the front and rear clutch drums 41 and 42 so that they may rotate independently of each other to break the power path to the rear drive wheels of the tractor. A link 79, Figures 4 and 5, connects the yoke 74 to the crank arm 81 of a shaft 82 journaled in a cover plate 83, bolted to the exterior face of the tractor housing. The shaft is rotated by means of a clutch throwout lever 84 suitably positioned for operation by the driver of the tractor.

Figure 2:
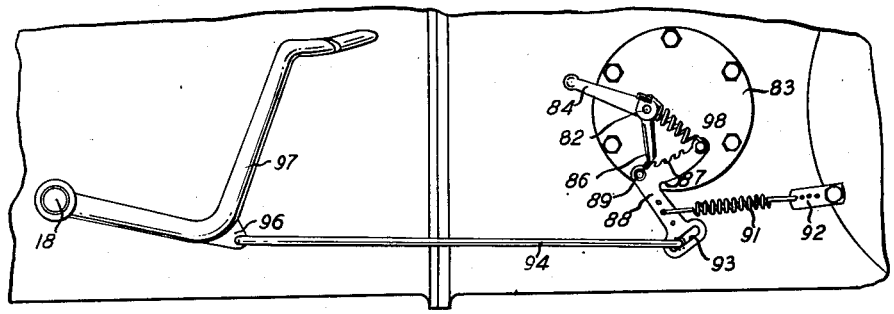
Figure 2 is an enlarged side elevational view of a portion of the tractor shown in Figure 1 and illustrating particularly the interlock mechanism.

The clutch throwout lever 84 is shown in Figure 2 in the clutch engaged position and is rotated in a counter-clockwise direction to shift the clutch throwout collar 63 forwardly to disengage the tractor clutch. The clutch throwout lever 84 is in the form of a bell crank and has a pawl 86 formed at the end of its downwardly depending leg for engagement with ratchet teeth 87 provided on the L-shaped ratchet lever 88. The ratchet lever 88 is pivoted to the cover plate 83 by means of a pivot pin 89 and is biased in a counter-clockwise direction by a spring 91, the rearward end of which is adjustably connected to an anchor plate 92 mounted upon the side of the rear axle housing. It will be apparent that operation of the clutch throwout lever 84 to disengage the traction clutch interlocks the throwout lever with the ratchet lever so that the throwout lever cannot be returned to re-engage the traction clutch.

The lower end of the L-shaped ratchet lever 88 is provided with an arcuate slot 93 receiving the rearward bent end of a rod 94, the forward end of which is connected to a lug 96 depending from an intermediate portion of the clutch pedal 97. The clutch pedal 97 is mounted upon the clutch shaft 18 for operation of the main tractor clutch 11 as hereinbefore described and is shown in Figure 2 in clutch engaged position. Upon depression of the clutch pedal 97 to disengage the main clutch of the tractor it will be noted that the rod 94 is pulled forwardly. The initial portion of the travel of the clutch pedal and the rod 94 is ineffective to rotate the ratchet lever 88 due to the lost motion connection between the rearward end of the rod 94 and the arcuate slot 93 in the ratchet lever. The arrangement is such that when the clutch pedal has been depressed sufficiently far to disengage the main clutch 11 of the tractor the rearward end of the rod 94 will engage the end of the slot 93 and further movement of the clutch pedal will result in rotation of the ratchet lever 88 in a clockwise direction. This movement of the clutch ratchet lever 88 releases the pawl 86 from the teeth 87 and permits the traction clutch throwout lever 84 to be swung in a clockwise direction under the bias of a coil spring 98 interconnecting the levers 84 and 88. This movement of the traction clutch throwout lever 84 releases the throwout collar 63 of the traction clutch and permits it to be moved by the coil spring 64 into engagement with the forward end of the forward speed drive spring 57, Figure 3, to engage the traction clutch and connect the front and rear clutch drums 41 and 42 as previously described.

It will be apparent that this construction provides an effective interlocking mechanism preventing the auxiliary clutch 32 from being re-engaged until the main clutch 11 has been disengaged. Thus, at no time is the auxiliary clutch 32 required to take the entire starting load of the tractor and the implement connected thereto, and consequently a saving can be effected in the construction of the clutch and the type selected.

The auxiliary clutch 32 may be disengaged by a simple movement of the clutch throwout lever 84 to disconnect the rear tractor drive wheels from the engine without interrupting the flow of power to the hydraulic pump 26 and the power takeoff shaft 27. This enables continuous hydraulic power to be supplied to lift and lower implements such as front end loaders, grading equipment and buck rakes, even though the tractor itself is stopped. Likewise, continuous power may be supplied through the power take-off shaft to power driven implements such as combines and corn pickers during the time intervals when the tractor is stopped. This not only assists in preventing the grain or corn from becoming jammed in the implement but also enables the entire power of the tractor engine to be applied to the power takeoff shaft to clear any jams which may occur.

While the drawings show a traction clutch of the spring type, it will be understood that various other types of clutches may be used for this purpose, and it will also be understood that the invention is not to be limited to the exact construction shown and described, but that various changes and modifications may be made without departing from the spirit and scope of the invention, as defined in the appended claims.

What is claimed is:

1. In an agricultural tractor, a power plant, a variable speed transmission having axially aligned input and output shafts and a radially spaced countershaft constantly driven from said input shaft, an auxiliary power shaft driven by said countershaft, a main clutch between said power plant and the input shaft of said transmission, traction wheels for said tractor, an auxiliary clutch between the output shaft of said transmission and said traction wheels, a throwout collar for said auxiliary clutch, a manually operated control lever, linkage interconnecting said control lever with said clutch throwout collar, a pawl and a ratchet lever having teeth adapted to be engaged by said pawl and cooperating with said control lever to prevent movement of said control lever to disengage said auxiliary clutch, a clutch pedal for operating said main clutch, and means interconnecting said clutch pedal and said ratchet and pawl mechanism to release the engagement between said pawl and said ratchet teeth when said clutch pedal is operated to disengage said main clutch.

2. The structure defined by claim 1 which is further characterized in that the means interconnecting said clutch pedal and said ratchet and pawl mechanism has a lost motion connection permitting said clutch pedal to be moved sufficiently far to disengage said main clutch prior to releasing said ratchet and pawl mechanism, and spring means biasing said control lever to automatically move said control lever in a direction to re-engage said auxiliary clutch when said pawl and ratchet teeth are disengaged.

3. In an agricultural tractor, a power plant, a variable speed transmission having axially aligned input and output shafts and a radially spaced countershaft constantly driven from said input shaft, a main clutch between said power plant and the input shaft of said transmission, a hydraulic pump and a power takeoff shaft driven by said countershaft and generally axially aligned therewith, traction wheels for said tractor, rear axle mechanism for driving said traction wheels including a rear axle drive pinion axially aligned with the output shaft of said transmission, a pair of concentric clutch drums connected respectively to said transmission output shaft and to said rear axle drive pinion, said clutch drums being in axial alignment with each other and having outer cylindrical frictional surfaces of the same diameter and forming a continuous frictional surface, a helical clutch friction spring encircling the aligned outer frictional surfaces of said clutch drums and having one end anchored to one of said drums, a clutch throwout collar mounted upon the other of said clutch drums for axial movement toward and away from the opposite end of said friction spring, a coil spring normally urging said clutch throwout collar toward said friction spring to force the adjacent end of said spring into frictional engagement with the adjacent clutch drum and to cause said friction spring to wrap into continuous frictional engagement with both clutch drums to lock the two drums together for unitary rotation, a manually operated clutch control lever, and linkage connecting said clutch control lever with said clutch throwout collar.

4. In an agricultural tractor, a power plant, a variable speed transmission having axially aligned input and output shafts and a radially spaced countershaft constantly driven from said input shaft, an auxiliary power shaft driven by said countershaft, a main clutch between said power plant and the input shaft of said transmission, traction wheels for said tractor, an auxiliary clutch between the output shaft of said transmission and said traction wheels to disconnect the power drive to said traction wheels without interrupting the drive to said auxiliary power shaft, said auxiliary clutch being normally and automatically held engaged in forward travel of the tractor, manually controlled clutch throwout means for selectively disengaging said auxiliary clutch, and interlocking means between said main and auxiliary clutches preventing said auxiliary clutch from being re-engaged except when said main clutch is disengaged.

5. In an agricultural tractor, a power plant, a variable speed transmission having axially aligned input and output shafts and a radially spaced countershaft constantly driven from said input shaft, a main clutch between said power plant and the input shaft of said transmission, a hydraulic pump and a power takeoff shaft driven by said countershaft and generally axially aligned therewith, traction wheels for said tractor, rear axle mechanism for driving said traction wheels including a rear axle drive pinion axially aligned with the output shaft of said transmission, a pair of concentric clutch drums connected respectively to said transmission output shaft and to said rear axle drive pinion, a helical clutch friction spring encircling said concentric clutch drums and having one end anchored to one of said drums, a clutch throwout collar mounted upon the other of said clutch drums for axial movement toward and away from the opposite end of said friction spring, a coil spring normally urging said clutch throwout collar toward said friction spring to force the adjacent end of said spring into frictional engagement with the adjacent clutch drum and to cause said friction spring to wrap into continuous frictional engagement with both clutch drums to lock the two drums together for unitary rotation, a manually operated clutch control lever, linkage connecting said clutch control lever with said clutch throwout collar, said clutch drum having concentric annular extensions forming inner and outer cylindrical clutch surfaces, the outer clutch surfaces being engaged by said friction spring to permit said drums to be locked together during forward travel of the tractor, and a second helical friction spring within said clutch drums, an auxiliary friction coil spring in constant engagement with the inner frictional surface of one of said drums and effective upon reverse rotation of said transmission output shaft to energize said inner helical friction spring to expand the latter into frictional engagement with the inner frictional surfaces of said drums to lock the two together in reverse travel of said tractor.

6. In an agricultural tractor, a power plant, a variable speed transmission having axially aligned input and output shafts and a radially spaced countershaft constantly driven from said input shaft, a main clutch between said power plant and the input shaft of said transmission, a hydraulic pump and a power takeoff shaft driven by said countershaft and generally axially aligned therewith, traction wheels for said tractor, rear axle mechanism for driving said traction wheels including a rear axle drive pinion axially aligned with the output shaft of said transmission, a pair of concentric clutch drums connected respectively to said transmission output shaft and to said rear axle drive pinion, a helical clutch friction spring encircling said concentric clutch drums and having one end anchored to one of said drums, a clutch throwout collar mounted upon the other of said clutch drums for axial movement toward and away from the opposite end of said friction spring, a coil spring normally urging said clutch throwout collar toward said friction spring to force the adjacent end of said spring into frictional engagement with the adjacent clutch drum and to cause said friction spring to wrap into continuous frictional engagement with both clutch drums to lock the two drums together for unitary rotation, a manually operated clutch control lever, linkage connecting said clutch control lever with said clutch throwout collar, a U-shaped yoke being pivotally mounted adjacent such clutch throwout collar and having lugs engaging said collar to actuate the latter, a link connecting said yoke to said clutch control lever, said control lever having an arm forming a pawl, a bell crank lever pivotally mounted and having ratchet teeth formed on one leg in position to be engaged by said pawl when the clutch control lever is moved in a direction to disengage said auxiliary clutch, a clutch pedal for operating said main clutch, linkage connecting said clutch pedal with the other leg of said bell crank lever and including a lost motion connection permitting sufficient travel of said clutch pedal to disengage said main clutch before said bell crank lever is moved, further movement of said clutch pedal being effective to rotate said bell crank lever and to move said ratchet teeth away from the pawl of the auxiliary clutch control lever to release the latter and to permit the auxiliary clutch to be re-engaged only when the main clutch is disengaged.

HAROLD L. BROCK.
LEON G. SMITH.

REFERENCES CITED

The following references are of record in the file of this patent:

UNITED STATES PATENTS

| Number | Name | Date |
|---|---|---|
| 1,011,174 | Eckhard | Dec. 12, 1911 |
| 1,269,804 | Faisst | June 18, 1918 |
| 1,455,169 | Moorhouse | May 15, 1923 |
| 1,612,846 | Williams | Jan. 14, 1927 |
| 1,923,819 | Gillett | Aug. 2, 1933 |
| 2,238,841 | Allgeyer | Apr. 15, 1941 |
| 2,347,352 | Lapsley | Apr. 25, 1944 |
| 2,489,699 | Clark | Aug. 29, 1949 |

FOREIGN PATENTS

| Number | Country | Date |
|---|---|---|
| 886,884 | France | Oct. 27, 1943 |